Patented Sept. 23, 1952

2,611,691

UNITED STATES PATENT OFFICE 2,611,691

PROCESS OF PRODUCING A COMPOUND FERTILIZER

Heinrich Tramm, Speldorf, Germany, assignor to Ruhrchemie Aktiengesellschaft, Oberhausen-Holten, Germany, a German joint-stock company No Drawing. Application May 23, 1949, Serial No. 94,930. In France June 4, 1948

5 Claims. (Cl. 71—37)

This invention relates to fertilizers, more especially of the mixed (compound) type.

It has for one of its objects the provision of a comparatively low priced fertilizer of this type possessing a high fertilizing value and being not hygroscopic and permanently well spreadable.

It is another object of the invention to provide a new mode of manufacture of a valuable mixed fertilizer which can be performed at low expense and in a small number of stages.

It is a still further object of this invention to provide a manufacturing process of the kind aforesaid which enables two separate branches of industry, the nitric acid manufacturers and the superphosphate factories, to cooperate to mutual advantage in the manufacture of a valuable fertilizer.

As is well known to those skilled in the art, numerous processes have been devised for the manufacture of mixed or compound fertilizers from crude phosphates. In these processes decomposition of the raw material is effected with sulfuric acid or nitric acid or both. The products of the decomposition are reacted with ammonium sulfate. The object of all these processes was the manufacture of high-grade, soluble, ballastfree fertilizers. To attain this object required an involved process including a great number of steps and the use of relatively large quantities of sulfuric acid and nitric acid as well as various filtration, evaporation or drying processes. The neutralization of the products of acid decomposition by ammonia is another known step. By these means citric acid-soluble fertilizers and citrate-soluble fertilizers are obtained.

The present invention relates to a simple and economical process of manufacturing a compound or mixed fertilizer, in which the attainment of a particularly high grade product is intentionally neglected. The manufacture is effected with the minimum expenditure of acid. Certain amounts of ballast substances are tolerated in order to reduce the number of process-steps and to reduce loss in transport. No conscious attempt is made to obtain a fertilizer which will be completely soluble in water, for such complete solubility is of theoretical interest only, as when on the soil, the water-soluble phosphate is converted into citrate-soluble phosphate. The water-solubility of one part of the compound fertilizer is satisfactory when taken in conjunction with the citrate-solubility of the other part.

According to the new process mineral phosphates are decomposed with the aid of mineral acid and more especially of nitric acid as far as monobasic calcium phosphate. The product so obtained is then treated with ammonium sulfate, and the product resulting from the treatment with ammonium sulfate is treated with gaseous ammonia.

A large variety of mineral phosphates, such for example as Moroccan, Algerian, or Tunisian phosphates, may be used as raw material. They are preferably treated with such quantities of sulfuric acid that the tribasic calcium phosphate is, for the most part, stoichiometrically converted into dibasic calcium phosphate and gypsum, and the carbonate into gypsum in accordance with the following equations:

I (a)

$$Ca_3(PO_4)_2 + H_2SO_4 + 2H_2O = 2CaHPO_4 + CaSO_4.2H_2O$$

I (b)

$$CaCO_3 + H_2SO_4 + H_2O = CaSO_4.2H_2O + CO_2$$

Sulfuric acid of an appropriate concentration is chosen whereby products are obtained which are as solid as possible. It is preferred to use the usual chamber sulfuric acid of about 67% concentration.

Instead of mineral phosphates, it is possible, in accordance with this invention, to use as raw material partially decomposed mineral phosphates, in particular crude phosphates which have been half or partly decomposed.

The concentration of the nitric acid used is so chosen, that, when the product of the breaking down or decomposition is treated with ammonium sulfate, a product is obtained, which is, for the most part, dry. For example, a nitric acid of 45–65% concentration may be used for this purpose. It is of advantage to use the nitric acid obtained directly in the process of oxidation of ammonia. It is surprising that with the use of so concentrated a nitric acid, little or no nitrogen-containing gases are evolved. The conversion proceeds according to the following equation:

(II)

$$2CaHPO_4 + CaSO_4.2H_2O + 2HNO_3 + 2H_2O = CaH_4(PO_4)_2 + Ca(NO_3)_2.2H_2O + CaSO_4.2H_2O$$

Owing to the hygroscopic nature of the calcium nitrate, the resultant compound fertilizer is difficult to spread.

In the next stage of the process the product of the breaking down or decomposition with nitric acid is treated with dry (solid) ammonium sulfate, the minimum quantity of which is chosen so that the calcium nitrate is converted into ammonium nitrate and gypsum according to the following equation:

(III)
$$CaH_4(PO_4)_2 + Ca(NO_3)_2.2H_2O + CaSO_4.2H_2O + (NH_4)_2SO_4 = CaH_4(PO_4)_2 + 2NH_4NO_3 + 2CaSO_4.2H_2O$$

An increase in the amount of ammonium sulfate added has a favourable effect on the properties of the compound fertilizer, in particular on the ease with which it can be spread, since the double salt $(NH_4)_2SO_4.2NH_4NO_3$ is formed.

Various advantages result from the treatment with ammonium sulfate. First, with the object of obtaining a relatively dry product, a great part of the water brought in with the nitric acid is combined with the gypsum. Further, the strongly hygroscopic calcium nitrate is converted into the less strongly hygroscopic ammonium nitrate. Here too, ammonia is combined, by the use of a relatively small amount of nitric acid, to yield a product rich in nitrogen. Finally, the sulfuric acid already used to combine with the ammonia during the technical extraction of ammonium sulfite, is utilized afresh for the conversion of the calcium nitrate into ammonium nitrate. The combination of the calcium in the form of insoluble gypsum instead of the soluble nitrate is of advantage in that it renders impossible the reverse formation of tribasic calcium phosphate from the dibasic calcium phosphate resulting in the last stage.

In a modified form of the process according to this invention, the breaking down or decomposition by nitric acid according to Equation II and the change by means of ammonium sulfate according to Equation III are carried out simultaneously. This is accomplished by dissolving part of the ammonium sulfate in the nitric acid.

Instead of using mineral phosphates as raw material, the normal commercial superphosphate may be used, and this may be mixed with mineral phosphate already broken down to monobasic calcium phosphate by means of nitric acid and ammonium sulfate.

The method of manufacture here described is of considerable economic importance, because it enables the superphosphate and nitrogen industries to work together for a common purpose. As a rule, the superphosphate factories have no nitrogen product at their disposal, either in the form of ammonia or as nitric acid. Therefore in order to be able to manufacture compound fertilizers, they must buy nitric acid and ammonia and transport both nitrogen compounds. On the other hand, nitrogen factories as a rule, have no sulfuric acid and also have no installation for the preparation of superphosphates. With the method of manufacture according to this invention, the nitrogen factories can obtain the superphosphates in the same form in which the fertilizer dealer or user receives them and can process them further with the nitrogen compounds obtained in their own production.

In the final stage of the process of this invention, the product obtained in the third stage is treated with gaseous ammonia, whereby in accordance with Equation IV dibasic calcium phosphate and dibasic ammonium phosphate are formed from the monobasic calcium phosphate:

(IV) $$CaH_4(PO_4)_2 + 2NH_4NO_3 + 2CaSO_4.2H_2O + 2NH_3 = CaHPO_4 + (NH_4)_2HPO_4 + 2NH_4NO_3 + 2CaSO_4.2H_2O$$

In this stage the ammonia is best used in such quantities that the ammonium citrate-solubility of the ortho-phosphoric acid attained in the breaking down by means of acid is retained as far as possible. This is achieved if the treatment with ammonia is continued until a pH value of at most 7, preferably 5, is reached.

Thus according to this invention a compound fertilizer is obtained which contains all the desirable constituents. It contains nitrogen, phosphorus and calcium, the nitrogen being present in the quickly assimilable nitrate form, and also in the slowly absorbed ammonium form, while the phosphorus is present in the water-soluble form as dibasic ammonium phosphate, and also, with calcium, in the citrate-soluble form, as dibasic calcium phosphate. According to the kind of crude phosphate and the amount and proportion of acids, of the ammonium sulfate and the ammonia, used, the compound fertilizer will contain 12–16% $P_2O_5$ and 7–12% N. It is easily layered and spread.

If, as in known processes, a quantity of mineral phosphate and ammonia is taken, and on the one hand the phosphate is broken down by means of sulfuric acid, while on the other, the ammonia is neutralized with sulfuric acid to form ammonium sulfate, then not only twice as much sulfuric acid is used as in the process of the present invention (where the same amount of sulfuric acid is utilized directly both for binding the ammonia and for the conversion with calcium nitrate and thus indirectly for the breaking down of calcium phosphate) but there is also spread on the soil double the quantity of soluble sulfate, which, in forming gypsum, takes calcium from the soil. In contrast to this, according to the process according to this invention, insoluble sulfate only is spread on the soil, which is not able to dissolve out any calcium.

The process can be carried out in an extremely simple and economical manner, if the quantative proportions and the concentration of the materials used for the breaking down, and the substances participating in the reaction are so selected that the required compound fertilizer is finally obtained in solid form without filtration, evaporation and drying. One particular method has proved most economical in which a product is obtained containing $P_2O_5$ and N in the ratio of 1:1, and containing the maximum of ammonium citrate-soluble ortho-phosphoric acid.

In practicing my invention, one may proceed for instance as follows:

*Example I*

2000 gms. of Moroccan phosphate containing 75% tribasic calcium phosphate and having a particle fineness of 0.1 mm., were stirred for about ½ hour with 920 gms. of 67% by weight sulfuric acid, and were then broken down for a further ½ hour with 984 gms. of 65% by weight nitric acid, in which, before mixing, 638 gms. of dry ammonium sulfate had been dissolved. After an interval of three days, the product of the reaction was passed through a 3 mm. sieve and then, within an hour, treated with a mixture consisting of one part by volume of ammonia gas and four parts by volume of air, until a watery extraction sample of the product showed a pH value of 6-7.

The compound fertilizer obtained—about 4.5 kilos—had the following content of P₂O₅ and N:

$P_2O_5 = 15.6\%$—of this 30% was water-soluble
 60% was citrate-soluble,
 and
 94% was citric acid-soluble $N = 9.72\%$— 3.22% in the form of nitrate
 6.50% in the form of ammonium Total, 9.72% N.

*Example II*

30 kilos of finely ground (0.1–0.2 mm.) Constantine phophate containing 66% tribasic calcium phosphate were well stirred for 30 minutes with 14.8 kilos of 67% by weight cold technical sulfuric acid, then kneaded for a further 30 minutes with 15.6 kilos of 54% technical nitric acid. The damp product of decomposition was then mixed for one hour with 25.3 kgs. of finely-ground mined ammonium sulfate. The various operations were carried out in a closed kneading machine fitted with a gas hood.

The loose, hard product of the breaking down process, was reduced to grains of 2 mm. by sieving and then treated in a spiral tube, until a pH value of 5 was reached, with 10% gaseous ammonia under cooling.

Analysis of the compound fertilizer gave:

$P_2O_5 = 11.1\%$—of this 60% was water-soluble
 80% was citrate-soluble
 95% was citric acid-soluble $N = 10.5\%$— 2.3% in the form of nitrate
 8.2% in the form of ammonia Total, 10.5% N.

*Example III*

In an agitator, 2 kgs. of very finely ground Constantine phosphate (containing 66% tribasic calcium phosphate) were broken down to nitrophosphate by an hour's reaction at about 60° C. with 2.7 kgs. of 52.5% by weight nitric acid, in which had been dissolved 1.4 kgs. of highly concentrated nitric acid in which 1.4 kgs. of ground ammonium sulfate had been dissolved. The breaking down can also proceed continuously in an agitator fitted with an overflow, other conditions being similar. After completion of the reaction a further 2 kgs. of sulfate of ammonia were added under violent stirring. After the lapse of five minutes the product was mixed in a spiral tube with 3.27 kgs. of a well ground superphosphate containing 18.5% total P₂O₅ or 17% water-soluble P₂O₅.

The hard compound fertilizer thus obtained was broken down to grains of 3 mm. size, which could then be alkalized immediately. In a spiral tube 10% gaseous ammonia was made to react with the mixture until a pH value of 5 was reached.

The final product had the following content of P₂O₅ and N:

$P_2O_5 = 10.6\%$—of this 59% was water-soluble,
 84% was citrate-soluble,
 and
 95% citric acid-soluble $N = 10.8\%$— 2.8% in the form of nitrate
 8.0% in the form of ammonia Total, 10.8% N.

Various changes may be made in the steps and substances described in this specification, without departing from the invention or sacrificing the advantages thereof.

I claim:

1. The process of producing a compound fertilizer which comprises mixing 2000 parts by weight of a finely subdivided raw phosphate containing about 75 per cent tribasic calcium phosphate during about one-half hour with about 920 parts of a 67% by weight sulfuric acid and another half hour with 984 parts of 65% by weight nitric acid, in which about 640 parts solid ammonium sulfate had been dissolved, the foregoing steps being performed under continuous agitation, allowing the mixture to stand several days, passing the product through a sieve and treating the sieved product with a gaseous mixture of one part by volume of ammonia gas and four parts air until a watery extraction sample shows a pH value ranging between about 6 and 7.

2. The process of producing a compound fertilizer which comprises mixing about 30 parts by weight of a raw finely subdivided phosphate containing about 65 per cent tribasic calcium phosphate about half an hour with about 15 parts of cold 67% by weight sulfuric acid, intimately mixing the reaction mass with about 16 parts of 54% by weight nitric acid, mixing the product of said latter treatment about one hour with about 25 parts finely subdivided ammonium sulfate, and treating the resulting product after sieving with dilute ammonia gas until a pH value of about 5 is reached.

3. A process for producing a substantially dry, non-caking, permanently well-spreadable fertilizer containing phosphoric acid and nitrogen both as a nitrate and as an ammonium compound which comprises reacting a substantially dry solid initial material containing tricalcium phosphate and calcium carbonate with concentrated sulfuric acid in approximately an amount theoretically required for the conversion of the tricalcium phosphate into dicalcium phosphate with the production of calcium sulfate and of the calcium carbonate into calcium sulfate while agitating, the concentration of the sulfuric acid being such that the water added therewith is combined with the calcium sulfate as water of crystallization and a substantially solid reaction mixture obtained, acting on the reaction mixture while continuing agitation with concentrated nitric acid in approximately an amount theoretically required to convert the components of the reaction mixture into a damp product containing monocalcium phosphate and calcium nitrate, mixing said damp product with sufficient solid ammonium sulfate to theoretically convert substantially all the hygroscopic calcium nitrate into non-hygroscopic ammonium nitrate and a further quantity of calcium sulfate, the concentration of the nitric acid being such that the water added with the nitric acid will combine with the further quantity of calcium sulfate as water of crystallization thus producing a substantially dry product and acting on the resulting product with the quantity of ammonia gas required to convert the monocalcium phosphate into dicalcium phosphate and diammonium phosphate and produce a pH in the final product of less than 7.

4. A process for producing a substantially dry, non-caking, permanently well-spreadable fertilizer containing phosphoric acid and nitrogen both as a nitrate and as an ammonium compound, which comprises reacting a substantially dry solid initial material containing tricalcium phosphate and calcium carbonate with concentrated sulfuric acid in an amount approximately theoretically required for the conversion of the tricalcium phosphate into dicalcium phosphate with the production of calcium sulfate and of the calcium carbonate into calcium sulfate while agitating, the concentration of the sulfuric acid being such that the water added therewith is combined with the calcium sulfate as water of crystallization and a substantially solid reaction mixture obtained, acting on the reaction mixture while continuing agitation with concentrated nitric acid and solid ammonium sulfate, the nitric acid being in an amount approximately that theoretically required to convert the components of the reaction mixture into monocalcium phosphate and calcium nitrate, and the ammonium sulfate being sufficient in amount to theoretically convert substantially all the hygroscopic calcium nitrate into non-hygroscopic ammonium nitrate and a further quantity of calcium sulfate, the concentration of the nitric acid being such that the water added with the nitric acid will combine with the further quantity of calcium sulfate as water of crystallization thus producing a substantially dry product and acting on the resulting product with the quantity of ammonia gas required to convert the monocalcium phosphate into dicalcium phosphate and diammonium phosphate and produce a pH in the final product of less than 7.

5. The process of claim 4 wherein at least part of the ammonium sulfate acting on the reaction mixture is added thereto together with the nitric acid.

HEINRICH TRAMM.

REFERENCES CITED

The following references are of record in the file of this patent:

UNITED STATES PATENTS

| Number | Name | Date |
|---|---|---|
| 1,517,687 | Voerkelius | Dec. 2, 1924 |
| 1,948,520 | Harvey | Feb. 20, 1934 |
| 1,950,945 | Luscher | Mar. 13, 1934 |
| 2,134,013 | Turrentine | Oct. 25, 1938 |

FOREIGN PATENTS

| Number | Country | Date |
|---|---|---|
| 104,682 | Great Britain | Mar. 5, 1917 |
| 352,739 | Great Britain | July 16, 1931 |
| 430,380 | Great Britain | June 18, 1935 |